(12) United States Patent
Steen et al.

(10) Patent No.: US 8,319,126 B2
(45) Date of Patent: Nov. 27, 2012

(54) LIQUID SWITCHES AND SWITCHING DEVICES AND SYSTEMS AND METHODS THEREOF

(76) Inventors: Paul H. Steen, Ithaca, NY (US); Peter Ehrhard, Dossenheim (DE); Michael J. Vogel, Voorhees, NJ (US)

( * ) Notice: Subject to any disclaimer, the term of this patent is extended or adjusted under 35 U.S.C. 154(b) by 302 days.

(21) Appl. No.: 12/860,541

(22) Filed: Aug. 20, 2010

(65) Prior Publication Data

US 2011/0036691 A1 Feb. 17, 2011

Related U.S. Application Data

(63) Continuation-in-part of application No. 11/496,242, filed on Jul. 31, 2006, now abandoned.

(51) Int. Cl.
*H01H 29/00* (2006.01)
(52) U.S. Cl. ........ 200/182; 200/188; 200/192; 200/209; 200/233
(58) Field of Classification Search .................. 200/182, 200/184, 187–188, 190–192, 195, 209, 233–235; 29/622; 137/814–816, 819, 822, 825, 827, 137/829, 831
See application file for complete search history.

(56) References Cited

U.S. PATENT DOCUMENTS

| | | | |
|---|---|---|---|
| 6,323,447 B1 * | 11/2001 | Kondoh et al. | 200/182 |
| 6,989,234 B2 * | 1/2006 | Kolar et al. | 435/287.2 |
| 7,164,090 B2 * | 1/2007 | Beerling | 200/182 |
| 7,271,688 B1 * | 9/2007 | Beerling et al. | 335/47 |
| 7,547,380 B2 * | 6/2009 | Velev | 204/547 |
| 7,909,974 B2 * | 3/2011 | Bartels et al. | 204/600 |
| 8,172,159 B2 * | 5/2012 | Hernandez | 239/3 |

* cited by examiner

*Primary Examiner* — Xuong Chung Trans
(74) *Attorney, Agent, or Firm* — LeClairRyan, a Professional Corporation (57) ABSTRACT

A dispensing apparatus includes a housing defining a channel, a plunger slidably engaged with an inner surface of the channel, a substrate with one or more passages each having two or more openings, a liquid in each of the one or more passages, at least one fluid, and a force application system. The substrate is disposed in the channel on one side of the plunger. The liquid in each of the one or more passages has a volume which exceeds an internal volume of each the one or more passages and forms a liquid drop around each of the openings. The liquid drops are fluidly connected to one another and each of the liquid drops is individually adjustable between two or more sizes. Each of the sizes and a location of each of the liquid drops define one of two or more switch positions. The fluid is located in the channel on the one side of the plunger and substantially surrounding the liquid drops. The force application system is configured to individually and selectively apply a force on the liquid in each of the one or more passages to control switching between the two or more switch positions of each of the liquid drops. Engaging one or more of the switch positions moves the plunger along the inner surface of the channel away from the substrate.

16 Claims, 8 Drawing Sheets

LIQUID SWITCHES AND SWITCHING DEVICES AND SYSTEMS AND METHODS THEREOF

This is a continuation-in-part of U.S. patent application Ser. No. 11/496,242, filed Jul. 31, 2006, which is hereby incorporated by reference in its entirety.

FIELD

The present invention generally relates to switches and, more particularly, to capillary switches, switching devices and methods thereof.

BACKGROUND

Switches are characterized by two or more switch positions in which a stable or metastable state is set and force must be applied in order to overcome a resistance when changing from one switch position to another. This resistance is usually formed by elastic spring elements whose resulting spring forces must be overcome during a switch position change. The common light switch on the wall is an example where the push and pull that gives rise to the two positions ('on' and 'off') arises from spring elements set in opposition to one another. For the switch to change positions, there must be an agent of force application. For the wall light switch, the typical agent of force is the human finger. A combination of switch and a system that can apply a force to alter the switching position will be called a "switching device." The wall switch and human agent constitute a switching device. Groups or arrays of switching devices will be referred to as "switching systems."

Capillary switches also work according to this basic principle. Herein "capillary" means pertaining to or as a manifestation of surface tension. In this type of switch, the spring forces are formed by the surface tensions of the liquid used. The basic principles for a capillary switch are known from, Boys, C.V.: "Soap Bubbles and the Forces which Mold Them", Doubleday Anchor Books (1890), which is herein incorporated by reference in its entirety. Two soap bubbles which correspond via a connecting tube and are filled with air are described therein. Each of the soap bubbles endeavors to reduce the air volume which it surrounds due to surface tension, or in other words, to respectively press air into the other soap bubble via the connecting tube. Since the surface tensions of each soap bubble make it such that the bubble surface is kept as small as possible, two stable operation states emerge which are characterized by a large (super-hemispherical) and a small (sub-hemispherical) bubble. In other words, one stable state has bubble A large and bubble B small while the other stable state has bubble B large and bubble A small.

SUMMARY

A switching device in accordance with embodiments of the present invention includes a substrate with a passageway system comprising one or more channels and a force application system. Each of the channels in the substrate has two or more openings. A liquid in the passageway system whose volume exceeds an internal volume of the passageway system forms a liquid drop around each of the openings. The liquid drops are connected to one another by the liquid in the one or more channels, each of the liquid drops is adjustable between two or more sizes, and each of the sizes and a location of each of the liquid drops defines one of two or more switch positions. The force application system applies a force on the liquid to control switching between the two or more switch positions.

A method for making a switching device in accordance with other embodiments of the present invention includes forming a system with a passageway comprising one or more channels in a substrate and a force application system. The passageway in the substrate has two or more openings. A liquid is placed in the passageway whose volume exceeds an internal volume of the passageway in the system and forms a liquid drop around each of the openings. The liquid drops are connected to one another by the liquid in the one or more channels. Each of the liquid drops is adjustable between two or more sizes and each of the sizes and a location of each of the liquid drops defines one of two or more switch positions. The force application system provides a force on the liquid to control switching between the two or more switch positions.

A transport system for the conveyance of an object in accordance with other embodiments of the present invention includes a plurality of passageways which are arranged to be adjacent to one another and each of the passageways has two or more openings and a force application system. A liquid in each of the plurality of passageways whose volume exceeds an internal volume of the plurality of channels forms a liquid drop around each of the openings. The force application system applies a force on the liquid to control switching between the two or more switch positions. The liquid drops are connected to one another by the liquid in the plurality of passageways. Each of the liquid drops is adjustable between two or more sizes and each of the sizes and a location of each of the liquid drops defines one of two or more switch positions. The liquid in each of the droplets is individually controllable by the force application system and the liquid has a wettability relative to the surfaces of the object to be moved that accommodates the object being pushed or pulled by the droplet.

A retention system for the adhesive retention and release of one or more objects in accordance with other embodiments of the present invention includes a plurality of passageways which are arranged to be adjacent to one another and each of the passageways has two or more openings and a force application system. A liquid in each of the plurality of passageways whose volume exceeds an internal volume of the plurality of passageways forms a liquid drop around each of the openings. The force application system applies a force on the liquid to control switching between the two or more switch positions. The liquid drops are connected to one another by the liquid in the plurality of passageways. Each of the liquid drops is adjustable between two or more sizes and each of the sizes and a location of each of the liquid drops defines one of two or more switch positions. The liquid in each of the droplets is individually controllable by the force application system and the liquid has a wettability relative to the surfaces of the object that accommodates the object being retained or released by the droplets.

An optical light switch system for one or more light beams in accordance with other embodiments of the present invention includes a system comprising a substrate with one or more passageways where each of the passageways has two or more openings, a force application system, and a control system. A liquid in the one or more passageways whose volume exceeds an internal volume of the one or more passageways forms a liquid drop around each of the openings. The liquid drops are connected to one another by the liquid in the one or more passageways. Each of the liquid drops is adjustable between two or more sizes, and each of the sizes and a location of each of the liquid drops defines one of two or more switch positions. The force application system applies a force on the liquid to control switching between the two or more switch positions. The control system is coupled to the force application system and controls the force activation system to switch to one of the switch positions so a light beam impinges on the liquid drop in one of the switch positions.

A dispensing apparatus includes a housing defining a channel, a plunger slidably engaged with an inner surface of the channel, a substrate with one or more passages each having two or more openings, a liquid in each of the one or more passages, at least one fluid, and a force application system. The substrate is disposed in the channel on one side of the plunger. The liquid in each of the one or more passages has a volume which exceeds an internal volume of each the one or more passages and forms a liquid drop around each of the openings. The liquid drops are fluidly connected to one another and each of the liquid drops is individually adjustable between two or more sizes. Each of the sizes and a location of each of the liquid drops defines one of two or more switch positions. The fluid is located in the channel on the one side of the plunger and substantially surrounding the liquid drops. The force application system is configured to individually and selectively apply a force on the liquid in each of the one or more passages to control switching between the two or more switch positions of each of the liquid drops. One or more of the switch positions move the plunger along the channel away from the substrate.

A method for making a dispensing apparatus includes providing a housing which defines a channel and slidably engaging a plunger for movement along the channel. A substrate is disposed with one or more passages in the channel on one side of the plunger. Each of the passages has two or more openings. At least one liquid is provided in each of the one or more passages has a volume which exceeds an internal volume of each of the one or more passages and forms a liquid drop around each of the openings. The liquid drops are fluidly connected to one another, each of the liquid drops is individually adjustable between two or more sizes, and each of the sizes and a location of each of the liquid drops defines one of two or more switch positions. At least one fluid is provided in the channel on the one side of the plunger and substantially surrounding the liquid drops, the liquid is substantially immiscible with the fluid. A force application system is configured to individually and selectively apply a force on the liquid in each of the one or more passages to control switching between the two or more switch positions of each of the liquid drops. One or more of the switch positions move the plunger along the inner surface of the channel away from the substrate.

A switch in accordance with embodiments of the present invention has a number of applications, including by way of example only a transport device for microcomponents, a retention device, and an optical light switch.

A switch with at least two switch positions in accordance with embodiments of the present invention includes a passageway with one opening per switch position and a liquid which is contained and whose volume exceeds that of the passageway. Liquid drops therefore inevitably form at the openings, and the surface tensions, similarly to the aforementioned soap bubbles, endeavor to press the drop volume into the passageway in favor of a total drop surface area which is as small as possible.

In embodiments of the present invention, all liquids which have a surface tension are suitable for a switch, even solutions or suspensions. The surface tensions of the liquid drops act upon several openings connected by the liquid with the each other and thus bring about a positive pressure in the liquid.

Driven by the surface tension, the liquid at each opening endeavors to take on a drop surface area which is as small as possible and hence a drop volume which is as small as possible. Against this tendency, the total volume of the liquid in the droplets and the liquid in the passageways must remain essentially unchanged. The result is a compromise configuration wherein a large droplet may protrude from one or more openings and a smaller droplet from the other openings.

A poor wettability (wetting angle of over 90°) of the liquid on the material surface around the opening is needed for the functioning of the switch. Only in this manner is it ensured that the surface tension is released through a pressing of the drop volume into the passageway and not through an expansion of the wetted surface around the opening. In expansion, the liquid drop with a small wetted surface and which is nearly spherical at first approximation would increasingly transform into a spherical segment with an increased wetted surface (increased radius) and a smaller height (say, h), where not only the radius of the spherical segment increases (lower pressure), but rather also the ratio of drop volume to drop free surface area. The more the surface area is decreased, and the greater the portion of the volume that must be displaced, the worse the transmission ratio during the movement of the liquid into the passageway.

A poor wettability in embodiments of the present invention works in an advantageous manner. It keeps possible changes and, above all, expansion of the solid surface wetted by the liquid drop in the opening to a minimum. In this manner, an improved reproducibility of the switching operations of a switch is achieved; that is to say, the lines-of-contact of the liquid drops where liquid, gas and solid meet do not move significantly throughout the operation of the switch.

The reproducibility of the liquid drops and hence, as a direct consequence, the switching states and the energy or effort required for switching back and forth can be improved still further by designing the areas within the openings themselves as areas with a better wetting behavior with respect to the liquid in comparison to the aforementioned areas outside the openings. In this manner, the liquid/gas/solid line-of-contact or droplet boundary is the boundary between poorer and better wetting and is maintained independently of the switch position or the volume presently taken up by the liquid drop. This improvement can be technically achieved, by way of example only, by a selective coating of one of the two mentioned areas, by a ring electrode around the opening or by a passageway system with passages with good wettability that is arranged in a substrate with poor wettability.

It is within the scope of embodiments of the present invention to adapt the wetting behavior of the aforementioned surfaces by mechanical, physical or chemical processing of the surfaces or through measures of geometrical construction, such as making discrete sharp edges or rims around the openings in place of or in addition to the aforementioned material measures.

Another aspect of the switch relates to the application of a force on the liquid for the purpose of overcoming the resistance during the switching back and forth between switch positions. A switch position (stable state) can be realized by applying a force in a specific direction in a switching operation. By the force, which can be continually the same, pulsing or even impulsive, as in a single impulse, the liquid in the passage or passages in the system is pressed, depending on the direction of the force, in the direction of an opening into a liquid drop. Preferably in embodiments of the present invention, the force acts on the liquid in the passageways in one of the directions of flow, which is to say in the through-flow direction parallel to the passageways, where the direction of flow determines the switch position to be taken on.

The liquid drops are held together by the surface tension alone. It also lies within the scope of other embodiments of the present invention to encase the liquid drops so that evaporation losses in the liquid (or losses in the liquid due to miscibility against an adjacent liquid) are advantageously prevented to a large extent. These other embodiments require less volatile liquids or elastic membranes (latex rubber, for example) which, with increasing expansion, exert an increasing force on the liquid which must be taken into consideration when constructing the switch.

Firstly, for a single switch, assuming a simple force application system is available, for example an electronic system, the precise (electronic) control of the shape of the liquid/gas boundary surface (liquid drop surface area) becomes possible. This implies the possibility, for example, of constructing adjustable micro-optical instruments (such as lenses, switches, etc.). The single, small-scale switch or micro-switch can be controlled electronically or in other manners, such as with a mechanical micro-actuator.

The arrangement of a plurality of such micro-switches in an array, such as a distributed arrangement in a plate-shaped unit, opens up significantly greater possibilities. There are a wide range of highly interesting applications for an array of switching devices or a switching system.

For example, the array of micro-switches can be used in a transport device for the conveyance of objects (particles or drops) on a substrate in accordance with other embodiments of the present invention. In this example, limited wettability between the liquid in the switches in the array and the object to be transported is necessary in order to avoid permanent adhesion. These types of arrays of micro-switches can be used, for example, in microdosing or in microprocess systems ("lab-on-chip").

The array of micro-switches also can be used in a retention device for the adhesive retention and subsequent release of components by switchable wetting and releasing of the component by the liquid in the micro-switches in the array in accordance with other embodiments of the present invention. For good temporary adhesion, good wettability between the liquid in the micro-switches and the component is needed. The adhesive force accumulates with the number of actuating switches, so that relatively strong forces are possible. The strength-of-adhesion is dramatic with tens of thousands of contacts. The release is achieved by a simple switching of the micro-switches away from the component. This is facilitated by spacers that keep the component at 'arms-length' from the switchable array.

The array of micro-switches also can be used in an optical light switch for the steering, focusing, and/or switching of light beams through reflection, refraction, and/or transmission of light to the switchable liquid drops of the micro-switches in the array in accordance with other embodiments of the present invention. The switching processes are suitable for applications involving reproduction (receiving light) as well as for projection (sending light).

The force F, which a single switch can deliver as an actuator via one liquid drop, can be approximated with the equation $$F=\sigma \cdot R (\sigma=\text{surface tension, R=radius of the wetted surface}).$$

For N actuators working in parallel, for example in an array, the respective forces F accumulate approximately as N·F.

With respect to manufacturing technology, switches, particularly the aforementioned arrays with a plurality of micro-switches, pose special demands. With a diameter of the liquid drops of far under 1000 μm and similarly small spacing of the switches in an array, modern micro-manufacturing technologies (for example, galvanic method with a manufacture of the forms, for instance, using the LIGA method) in conjunction with solid state coatings (for example, CVD or PVD such as sputter or vapor deposit methods, etc.) are needed for the creation of a certain wetting behavior. Depending on the specific application, the working liquid or fluid must not only not wet the transported particles, but must also not be miscible with the drops to be conveyed (transport device), or must wet the solid to be retained (retention device). Such requirements can usually be met through the choice of the liquid or fluid in each of the switches and/or the choice of the solid materials or their coatings. In one of the exemplary embodiments of the present invention, water is the experimental liquid, porous glass is used as part of the osmotically active pump (frit), and Plexiglas is used for the housing and outlet.

Switches, particularly for the applications discussed herein which utilize an array of switches, may be individually addressable (switchable) or addressable in sub-arrays. The force application system in other embodiments of the present invention which applies a force on the liquid for the switching of the switch position is of a simple construction and of a high operational reliability without mechanically moveable components. By way of example only, other embodiments of the present invention use an electro-osmotic force, generated by placing an electric field across a liquid-filled porous material located in the passageway between droplets, which can move liquid against the high pressures due to surface tension at small scales. The electro-osmotic pump exploits electrostatic forces by subjecting the liquid to an electrical field between two electrodes. The electro-osmotic force that can be generated by an electro-osmotic pump is well-suited to oppose the resisting capillary force at small scales. The switch in combination with the electrosmotic force is a switching device with particularly attractive properties, especially for arrays of switches operating at small scales. The electro-osmotic force that can be generated by an electro-osmotic pump is also well-suited to overcome other resisting forces, such as the resistance of a sliding plunger.

The electrodes for this switching device can be manufactured particularly for the aforementioned arrays in dimensions on a micron-scale with the aforementioned manufacturing methods. Electrode dimensions on a micro-scale can produce, in an advantageous manner, a sufficiently high field intensity with relatively low electrical voltages, of less than 50 V, preferably less than 10 V.

Due to the discrete stable or metastable switch positions of the switch, no special requirements for the quantitative reproducibility or manufacturing tolerances for the force application system are needed.

For controlling the force application system, control units supported by electronic processing system with programmed instructions stored in memory for execution by a processor for carrying out the switching operations as described herein are particularly suitable, and in the case of low control voltages, the otherwise usual signal amplifiers are advantageously eliminated.

BRIEF DESCRIPTION OF THE DRAWINGS

FIG. 3b is a partially perspective and partially cutaway view of the capillary system shown in FIG. 3a;

DETAILED DESCRIPTION

Figure 1:
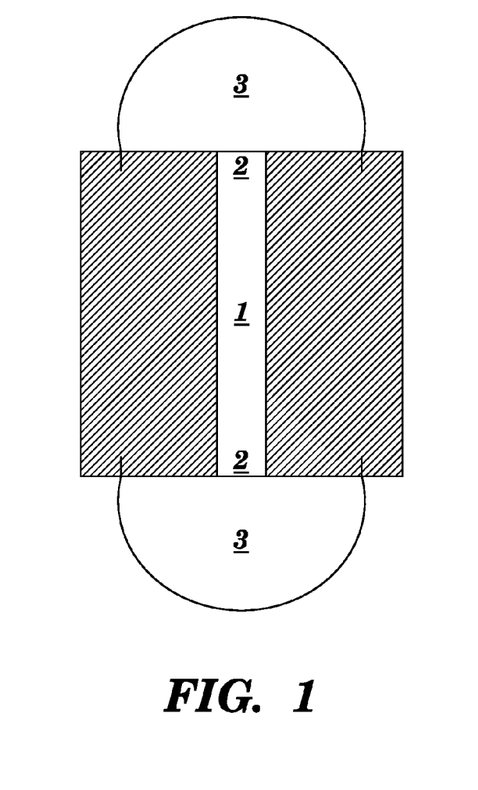
FIG. 1 is a cross-sectional view of a switch in accordance with embodiments of the present invention with a passageway comprising a single channel and with two switch positions.
Figure 2:
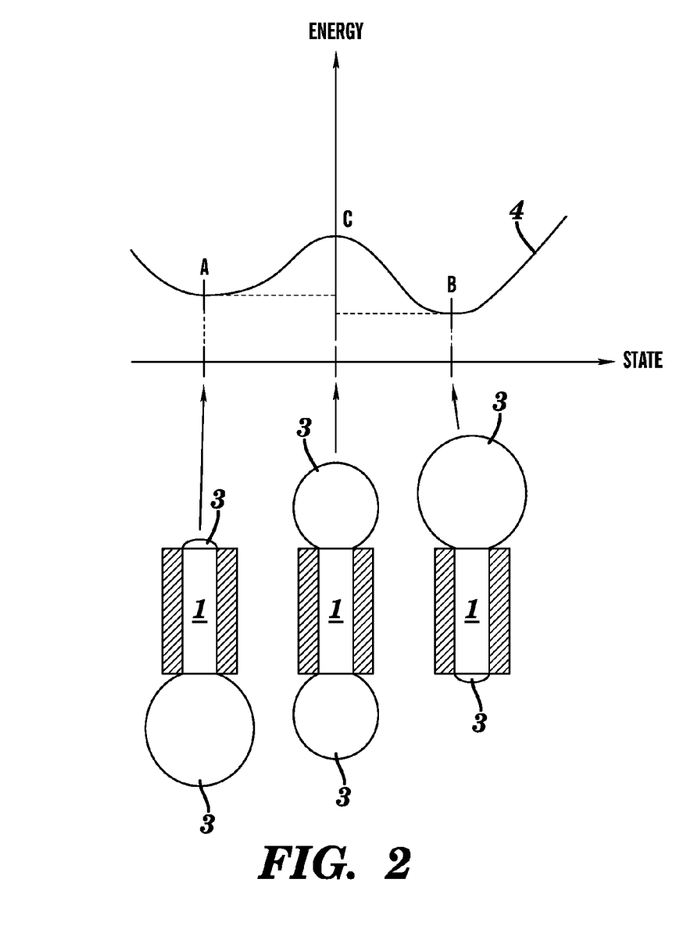
FIG. 2 is a cross-sectional view of the switch shown in FIG. 1 in three different switch positions and a corresponding diagram which illustrates an energy level for the switch positions and intervening configurations where two of the switch positions (A & B) are stable and one of the switch positions C is unstable.

A switch in accordance with embodiments of the present invention is illustrated in FIGS. 1 and 2. The switch includes a substrate that has a passageway comprising a channel 1 which is filled with liquid and which, in this particular example, has two openings 2, each with a liquid drop 3, although the switch can comprise other numbers and types of elements in other configurations. The liquid volume is larger than the internal volume of the channel 1 and extends into the liquid drop 3 via the openings 2 of the channel 1.

Referring to FIG. 2, three possible positions A, B, and C of numerous possible positions for the switch as well as the respective energy levels 4 of these positions depending on the fraction of total liquid volume held in the upper liquid drop of the switch are illustrated. In the two switch positions A and B, one liquid drop holds a large fraction of the volume, while the other liquid drop with small surface area holds a small fraction of the volume. In these positions, the energy level 4 is at a relative minimum, that is to say the switch takes on a stable position (B, absolute minimum in energy level) or a metastable position (A, relative minimum in energy level), whereas when a switch is made to move to the respective other switch position, the higher energy level of the unstable switch position C (see FIG. 1 and FIG. 2, lower middle) must be overcome. The energy level 4 increases again outside of switch positions A and B as well, which prevents a re-flow of the liquid from the internal capillary volume, limits the fraction of volume of the liquid drop and therefore prevents a rupturing of the liquid drop in the large volume-fraction state. In other sample embodiments as well, the positions of the switch are referred to as A, B and C in accordance with FIG. 2.

Figure 3A:
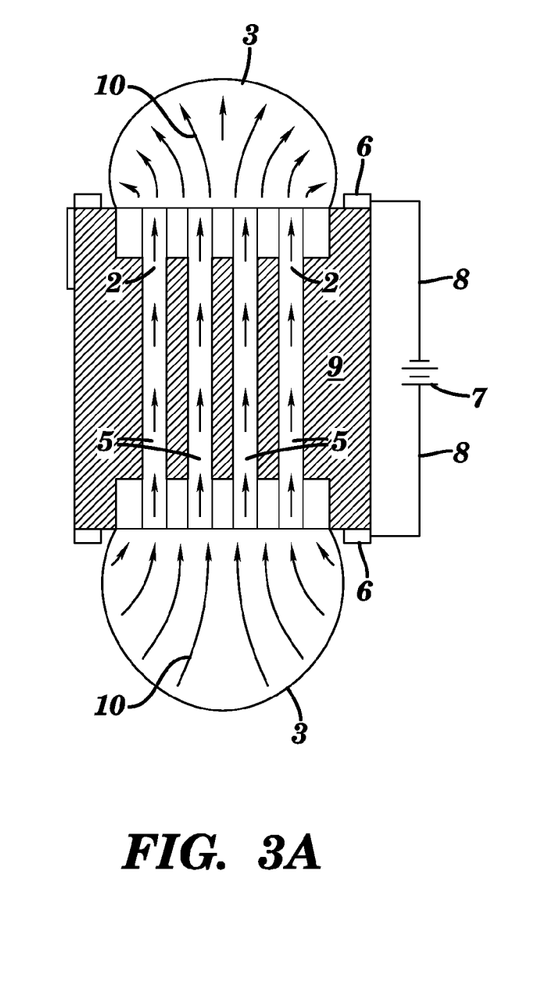
FIG. 3a is a cross-sectional view of a switching device with a passageway comprising several channels arranged to be substantially parallel to one another in accordance with other embodiments of the present invention.
Figure 3B:
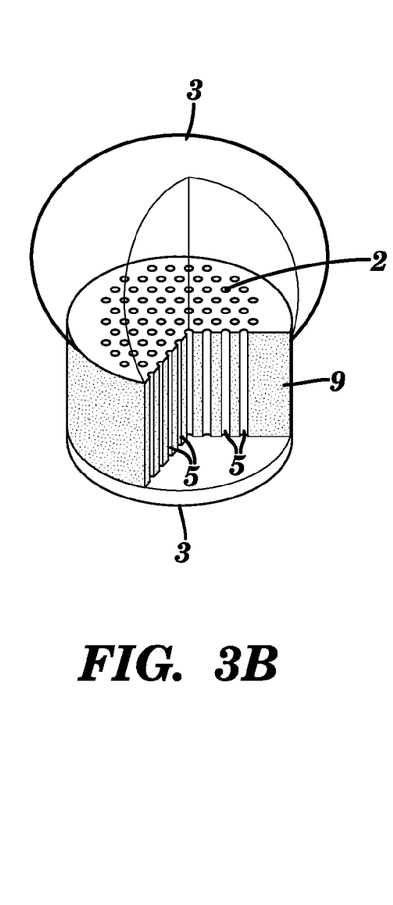

Referring to FIGS. 3a and 3b, a switching device with a passageway system and a force application system in accordance with another embodiment of the present invention is illustrated, although the switching device can comprise other numbers and types of elements in other configurations. In this particular embodiment, the passageway system includes a multitude of single channels 5 arranged in parallel to one another which are formed in a substrate 9. These channels may be very small in size and very large in number and each of the channels 5 leads to one of the two openings 2 on both sides of the substrate 9. FIG. 3a shows the switching device in proximity to switch position C and FIG. 3b shows the switching device in switch position B.

Also illustrated in FIG. 3a is the force application system which is an electro-osmotic pump that applies a force on the liquid in the channels, although other types of force application systems can be used. In this particular embodiment, the force application system comprises a ring electrode 6 around each of the two openings 2 on both sides of the substrate 9, as well as a voltage source 7 with electrical connection lines 8 for the loading of the ring electrodes 6 with a difference in electrical potential. In this manner, an electrical field is created within the liquid and the substrate 9. The field drives electrolytes in the liquid generating a difference in pressure between the two liquid drops. A sufficiently large field can overcome the pressure resistance and flow resistance to move liquid from one droplet to the other droplet, effecting the switching from one stable state to another.

Figure 4:
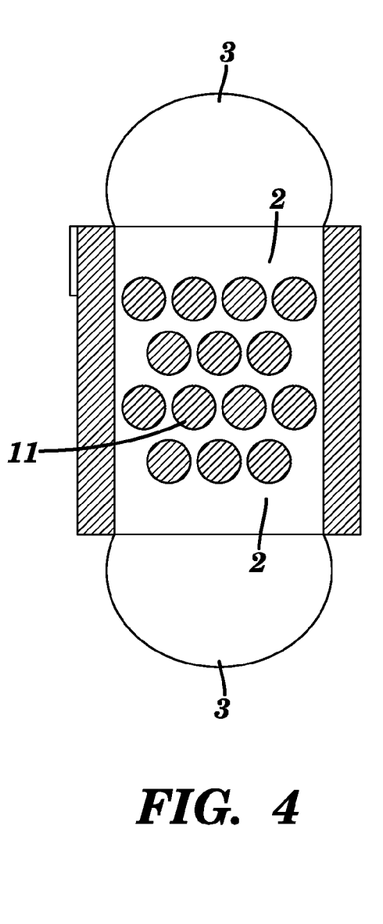
FIG. 4 is a cross-sectional view of another switching device with a passageway formed by a body with open porosity in accordance with other embodiments of the present invention.

Referring to FIG. 4, a switching device in accordance with embodiments of the present invention is illustrated. In this particular embodiment, the switching device comprises a porous body in a passageway of a substrate. The porous body can act as an electro-osmotic pump provided an electric field is placed across it (for ease of illustration the electrodes are not shown in FIG. 4 but are like those shown and described with reference to FIGS. 3a and 3B). In this particular embodiment, the porous body comprises a glass or ceramic filter or frit 11 which is located in the passageway of a substrate, although other types of porous bodies can be used and in other locations and configurations. The switching device shown in FIG. 4 is in proximity to position C described earlier with reference to FIG. 2.

Generally, evaporation losses in the liquid drops can be minimized through the appropriate selection of the ambient gas. Particularly, a liquid with a low vapor pressure with respect to the ambient gas is desirable, and losses of liquid can generally be compensated for by a feed line which leads into the capillary system and an appropriate liquid source. In this respect, pressurized chambers can also be used for isolating the liquid drops within a certain atmosphere. Evaporation can also be minimized by using two immiscible liquids, one with low vapor pressure next to the ambient gas and one with favorable properties for electro-osmotic pumping within the passageways.

Figure 5:
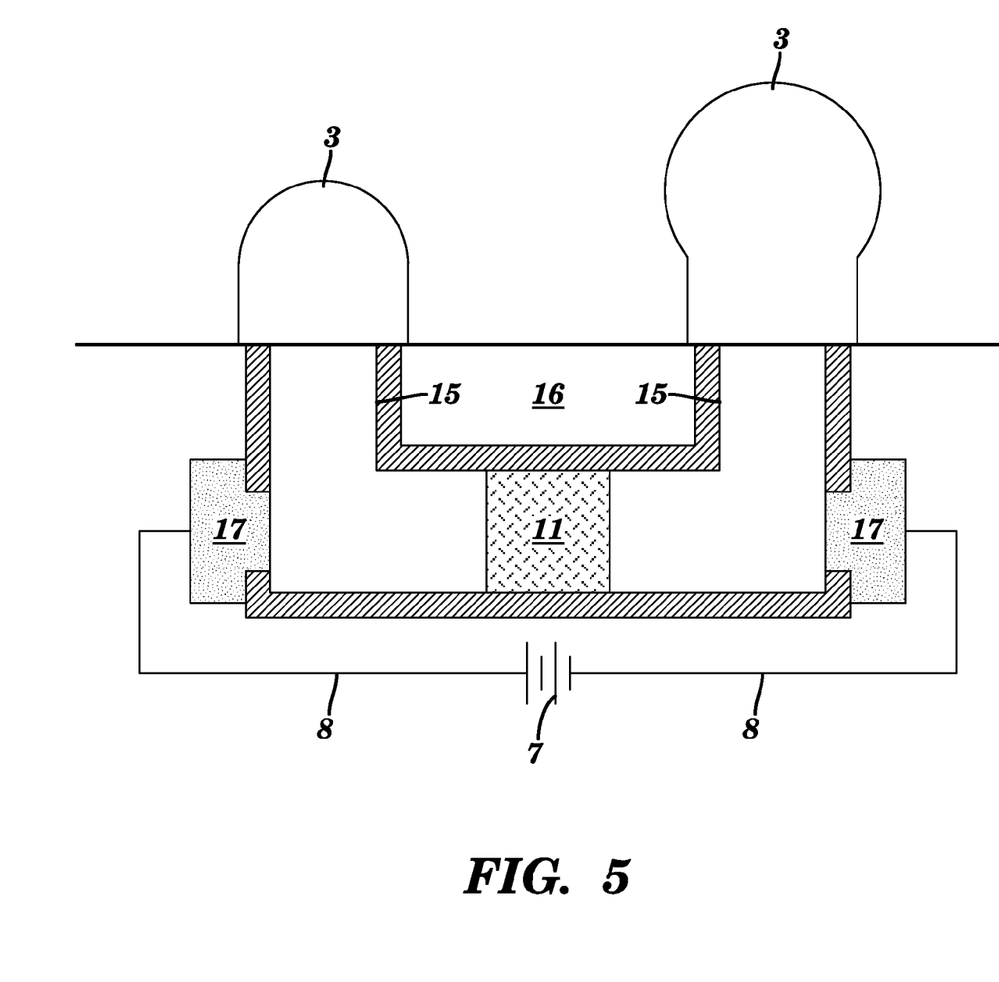
FIG. 5 is a cross-sectional view of another capillary system with an electro-osmotic pump located in a passageway in accordance with other embodiments of the present invention.

Referring to FIG. 5, an embodiment of a switching device with a curved passageway system and an electro-osmotic pump is illustrated. This switching device operates in accordance with the basic principle explained in the context of FIG. 3. The passageway system in FIG. 5 comprises a U-shaped connection line 15 between two liquid drops 3 which are arranged on one side of a substrate 16, in which are placed electrodes 17 for the production of an electrical field and also a frit 11 made of porous glass. When an electrical field is applied, the liquid is pumped through the frit 11 made of porous glass in a direction which is dependant on the field vector and leads, as a consequence of the differential pressure generated in the frit, to the switching of the capillary switch.

In so doing, care should generally be taken to ensure that the voltages in the electrodes 17 and the voltage density in the electrodes 17 is low enough so that no electrolysis occurs, which would cause a gradual degradation of the switching forces. The switching times can be set within a range of 0.05-10 s by (variable)electrical field intensities in the range of $10^3$-$10^5$ V/m for liquid drops with a diameter of approximately 1 mm, although faster switching is achievable.

A practical test for an electro-osmotically operated switching device was carried out with the embodiment according to FIG. 5 in the framework of a drop diameter of about 1.7 mm in a system comprising water (as liquid)/air (as ambient gas)/porous glass (as frit material) and Teflon (as substrate material). All essential characteristics, particularly those of the switch positions as well as the energy input required for switching back and forth (see FIG. 2) were successfully obtained in a reproducible manner. The reversible switching was done by application of a direct current of approximately 5 V between the two electrodes 17. The switching times were in the range of approximately 1 s.

Figure 6A:
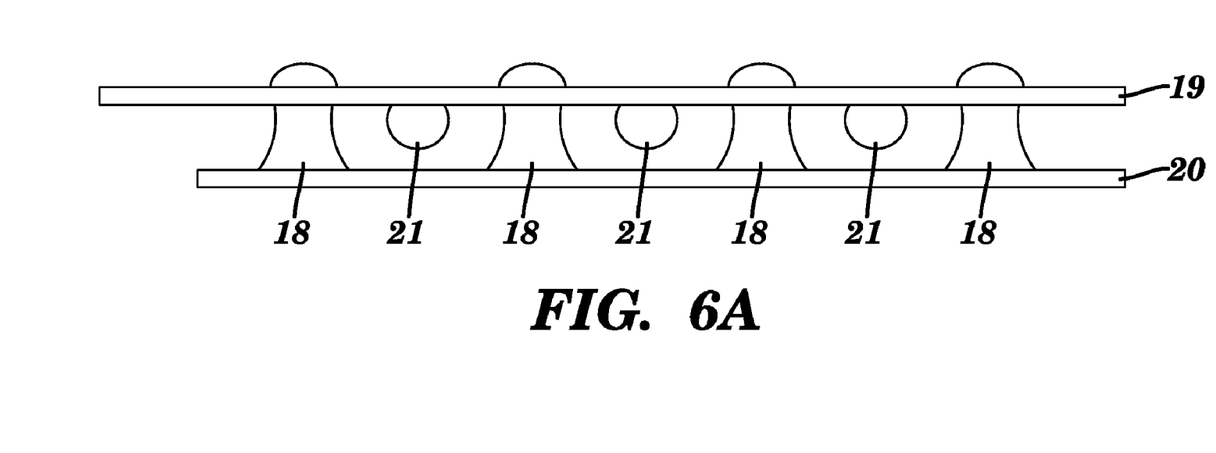
FIGS. 6a and 6b are cross-sectional views of a retention device comprising an array with a plurality of switches on a plate-shaped component in accordance with other embodiments of the present invention retaining and releasing an object, respectively.
Figure 6B:
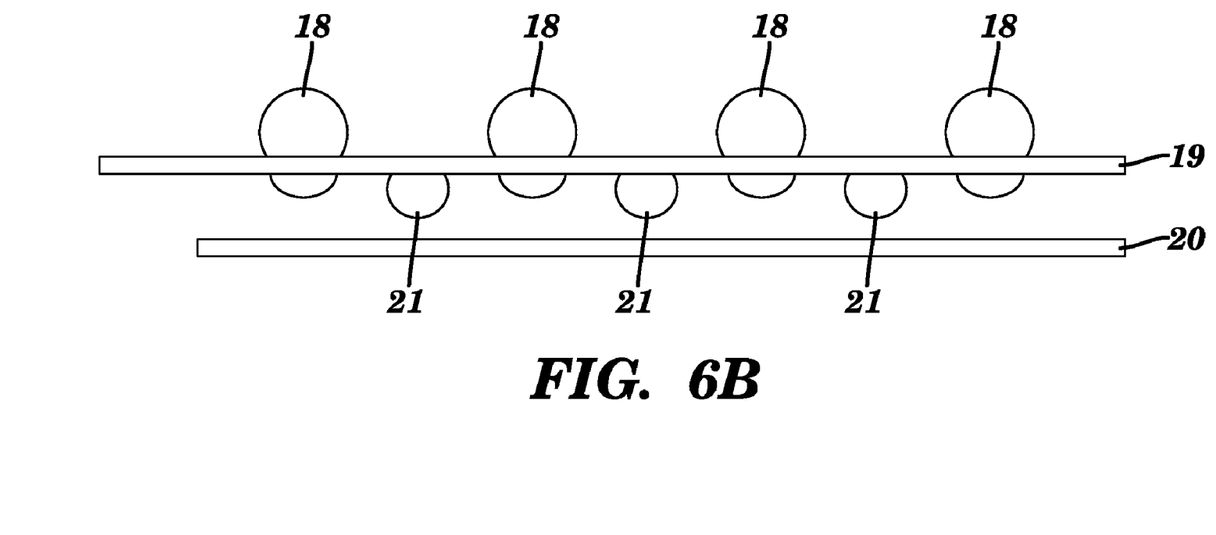
Figure 7:
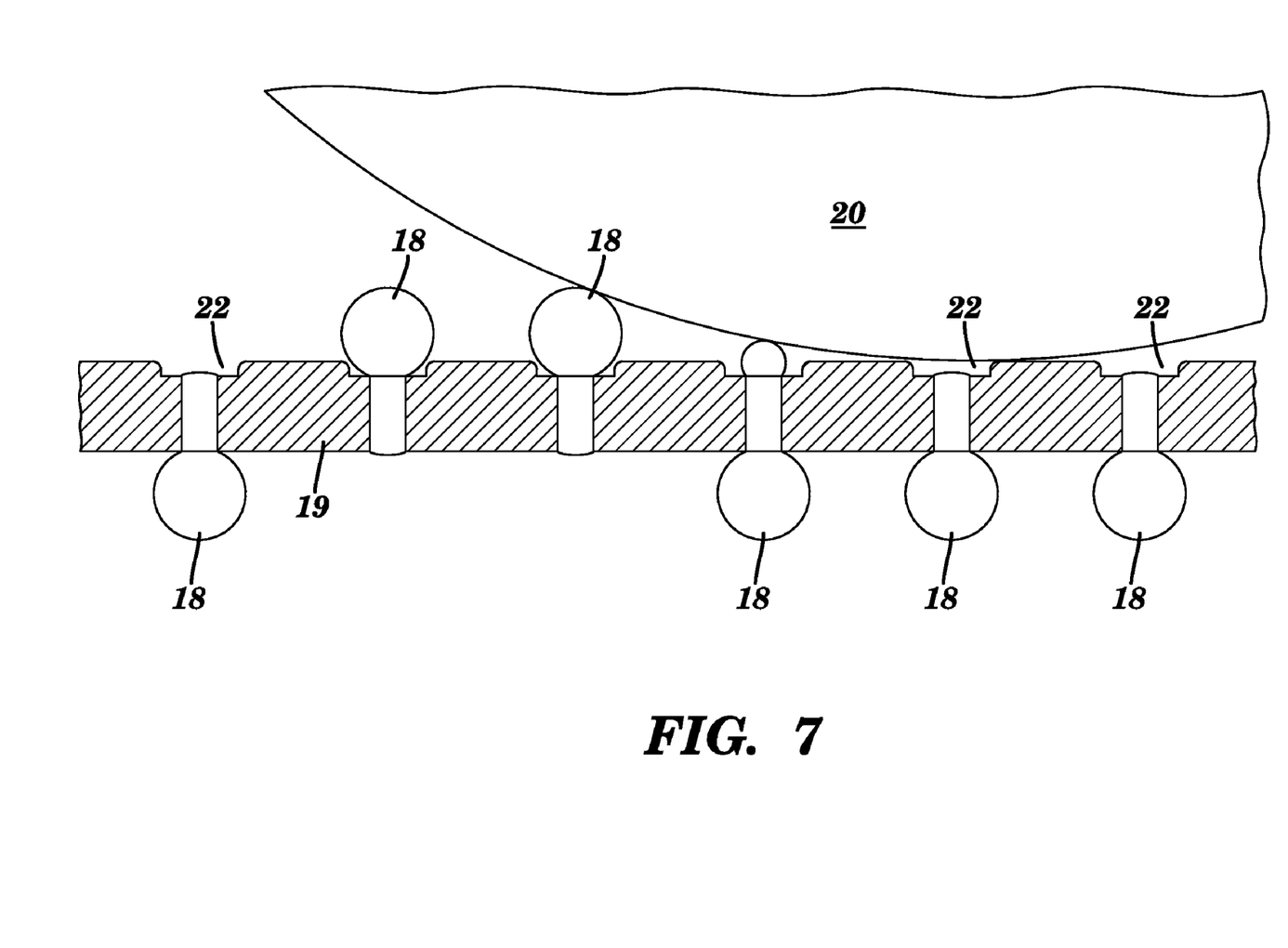
FIG. 7 is a cross-sectional view of a transport device for microcomponents comprising an array with a plurality of switches in accordance with other embodiments of the present invention.
Figure 8:
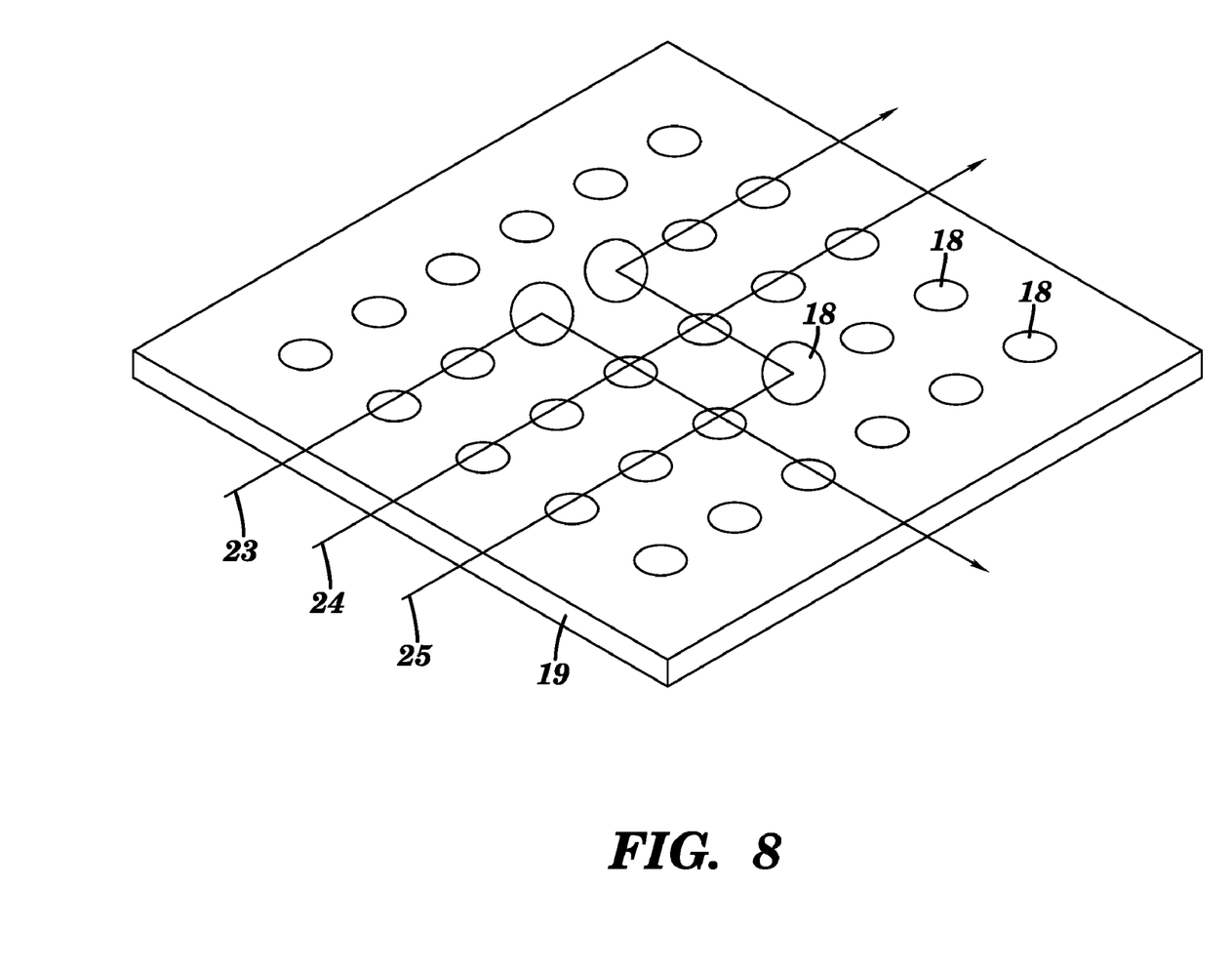
FIG. 8 is a cross-sectional view of an optical light switch comprising an array with a plurality of switches in accordance with other embodiments of the present invention.

Switching devices, either individually or in an array as mentioned above, are suited to a variety of applications, such as those illustrated in FIGS. 6-8 by way of example only.

Referring to FIGS. 6a and 6b, a schematic of an adhesive retention device in which a plurality of switching devices 18 are arranged in parallel on a plate substrate 19 is shown. The adhesive retention device retains an object 20 by adhesion when the switches in the adhesive retention device are in switch position A as shown in FIG. 6a and the array of switching devices release it again in switch position B as shown in FIG. 6b. In switch position B, the spacers 21 are used to make sure the object 20 does reliably separate from the liquid drop 3 of the switch. Accordingly, for this particular embodiment there must be a poor wettability between the material of the substrate 19 and the liquid and a good wettability between the liquid in the switches and the object 20. The present example demonstrates that the shapes of the liquid in the switching device are not limited to droplets, but may also include liquid bridges and other shape configurations as formed by capillarity and, if stable, these other shape configurations can be switching positions.

Individually controllable switching devices on a substrate are also suitable for other applications, such as transport devices for small objects as shown in FIG. 7. In a transport device, shown in FIG. 7, the object 20 to be transported rests on a plate 19 and is pushed (or pulled) in the desired direction by the activation of individual switches 18. The object to be transported must have a poor wettability with the liquid in order to prevent permanent adhesion. It is expedient to structure the switch in such a manner that the rest position, switch position A, is automatically taken on as a default, so that an application of energy is required only when and as long as the switch takes on the switch position B. This can be achieved in various ways, for example by a different structuring of the openings such as, for instance, a reduction in size and, as can be seen in FIG. 7, a recess 22 of the openings 2 of the switch. The recesses 22 have the function of spacers which make it difficult for the object 20 to come into contact with the upper liquid drop of the switches 18 when in switch position A. Surveillance for the purpose of selecting the switches 18 to be activated is done, for example, with the aid of camera systems.

An optical light switch shown in FIG. 8 is based on the same layout of the array as in the aforementioned transport device shown in FIG. 7. It is also expedient to structure the switch in such a manner that only switching to and remaining in switch position A requires the addition of energy. Only in switch position B are the upper liquid drops of individual switches used for the redirection, adsorption or transmission of light beams. By way of example only, FIG. 8 shows three light beams 23, 24, and 25. While light beam 24 leaves the array area unaffected, light beam 23 is redirected once by the switch, and light beam 25 is redirected multiple times. In addition, it is expedient to use, depending on the application, a transparent liquid (for refraction), an opaque liquid (for adsorption), or a liquid with a metallically reflective surface (redirection).

In an optical application, an adjusted (laser) beam would be either deflected or blocked by the large drop, whereas after switching it would be deflected in a different manner or allowed to pass through by the now small drop. In this manner, the path of the light can be controlled by the switch, and analogous parallel arrangements of many micro-capillary switches allows for the control of many light beams or even the construction of a discrete lens, also with adjustable focal length, for example. In the latter case, the capability of continuous adjustability or a switching to switch position B of different energy levels, a tuning of the switch would have to be provided for, for example by continuous pressure regulation acting upon a liquid drop.

In principle, embodiments of the present invention can in general be regarded as a liquid volume with a deformable surface (flexible container) which can take on two (bistable) or several possible forms (multistable, with more than two switch positions and/or with more than two openings 2 and liquid drops 3). The surface tension has the fundamental effect of deformable containment, and the electro-osmotic pump conveys the liquid (working fluid) to another area and thus makes the switching between the different container configurations possible. Systems with real membranes or structured interfaces (instead of the natural surface tension) are, in this sense, of the same type and are part of the invention.

Figure 9:
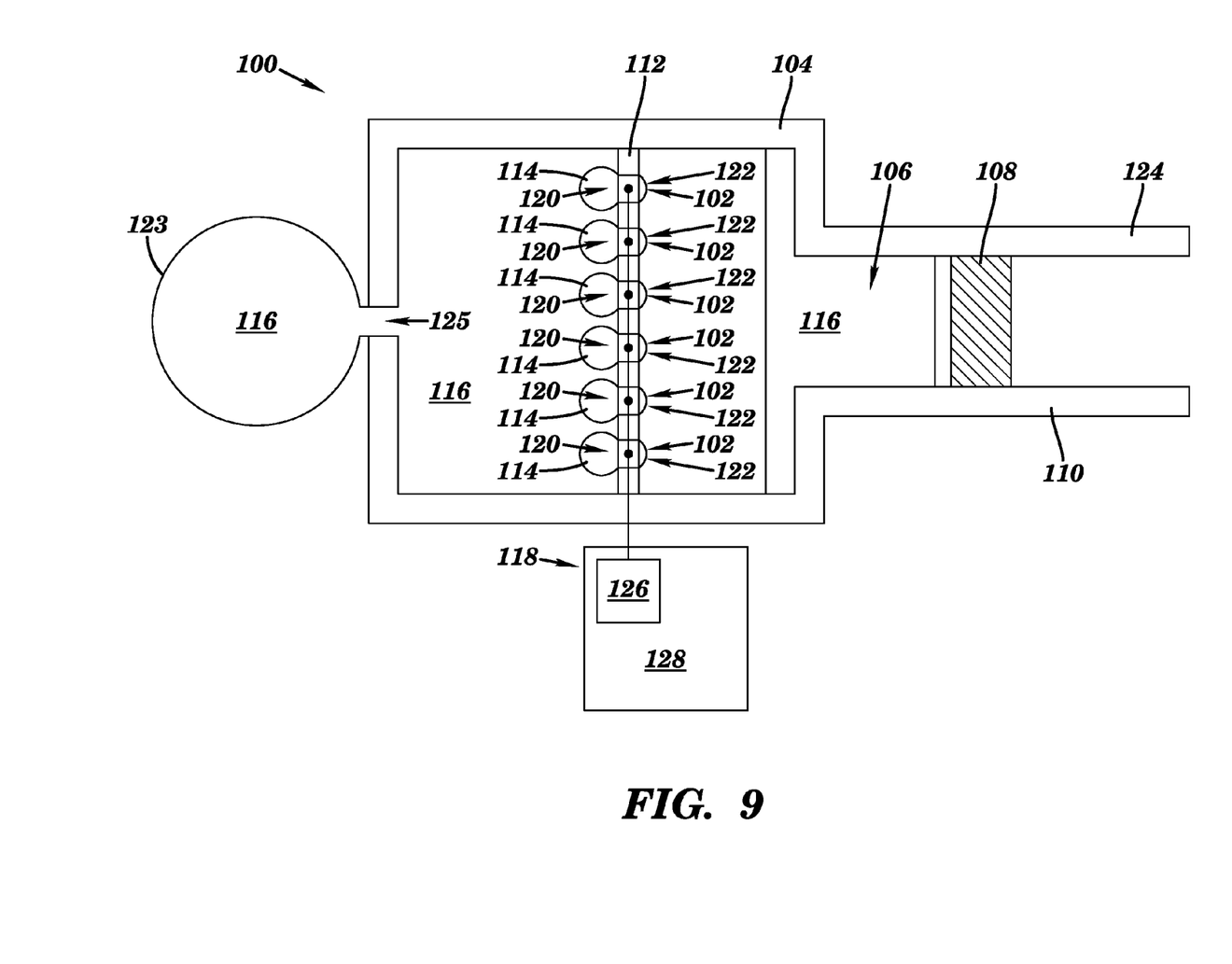
FIG. 9 is a side, cross-sectional view of an exemplary dispensing apparatus.

Referring to FIG. 9, an exemplary dispensing apparatus 100 is illustrated. The six switches 102 in the dispensing apparatus 100 are the same structurally and operationally as the exemplary switches previously illustrated and described herein, except as further illustrated and described herein. The dispensing apparatus 100 includes a housing 104 defining a channel 106, a plunger 108 slidably engaged with an inner surface of cartridge 110 detachably seated in the channel 106, a substrate 112, a liquid 114, a fluid 116, and a force application system 118, although the dispensing apparatus 100 could comprise other types and numbers of elements in other configurations.

The substrate 112 has six passages 120 which extend through the substrate 112 and each have two openings, although other numbers and types of passages with other configurations could be used. The substrate 112 is disposed in an enlarged section of the channel 106 on one side of the plunger 108, although the substrate 112 could be in other locations and could be sized to fit within the narrow part of the channel 106 or in other configurations.

The liquid 114 in each of the passages 120 has a volume which exceeds an internal volume of the each of the passages 120 and forms a liquid drop around each of the openings from the passages 120 as illustrated. The drops of liquid 114 or liquid drops are independently adjustable between two or more sizes, and each of the sizes and a location of each of the liquid drops defines one of two or more switch positions. The liquid 114 comprises water in this example, although other types of liquids and fluids could be used, such as an aqueous suspension, an aqueous solution, an emulsion comprising oil in water, and an emulsion comprising water in oil.

Figure 10:
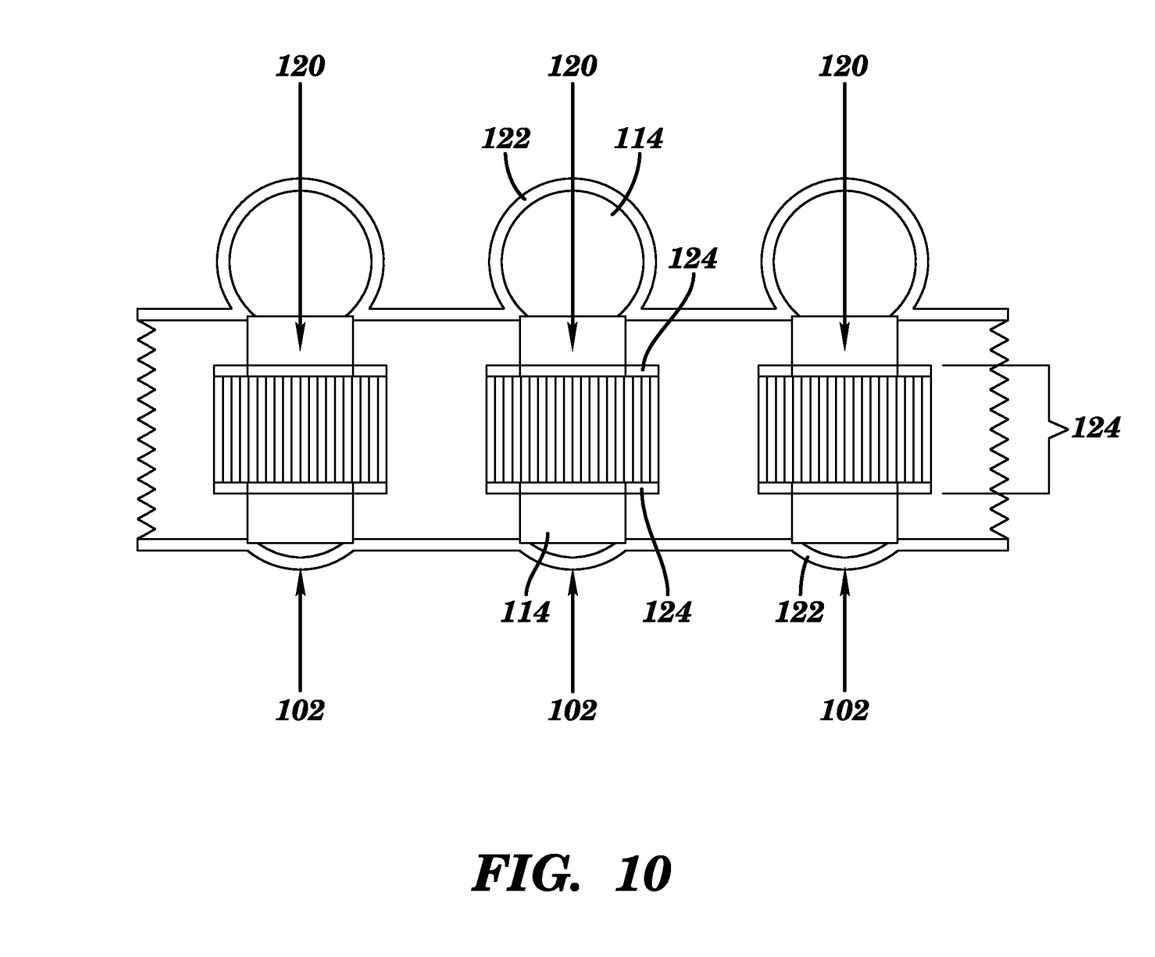
FIG. 10 is a side, cross-sectional view of a portion of the exemplary dispensing apparatus shown in FIG. 9 with optional membranes.

The fluid 116 is located in the channel 106 on the one side of the plunger 108 and substantially surrounding the drops of liquid 114. Although the same fluid 116 is shown on both sides of the substrate 112, other arrangements could be used, such as different fluids on each side like a liquid and a gas or two liquids. In this example the fluid 116 is another liquid which is substantially immiscible with the liquid 114 and is incompressible, although other types of fluids which are or are not immiscible with liquid 114 could be used, such as a gas. By way of example only, an optional membrane 122 on one or both sides of the substrate 112 could flexibly cover each of the openings from the passages 120 to separate the liquid 114 from the fluid 116 and then the immiscibility of the liquid 114 and fluid 116 is not needed. Additionally by way of example only, an exemplary membrane 122 on both sides of passages 120 of the substrate 112 is illustrated in FIG. 10, although other configurations could be used. An optional flexible reservoir structure 123 with fluid 116 is connected by a passage 125 to the channel 106 on one side of the substrate 112, although other types of arrangements could be used. By way of example only, if the fluid 116 on the side of the substrate 112 opposing the cartridge 110 was a gas, then instead of a reservoir structure 123 a one way pressure relief valve operating in the direction of substrate 112 could be located in the passage 125.

The optional cartridge 110 is detachably seated in the passage 106 and includes the plunger 108 which is slidably engaged for movement along an inner surface of the cartridge 110 and thus along the channel 106, although other configurations with other dispensing mechanisms can be used. For example, the plunger 108 could be slidably engaged with an inner surface of the channel 106 without a cartridge 110. A material to be dispensed, such as a drug by way of example only, can be preloaded in the cartridge 110 to be dispensed by controlled movement of the plunger 108 along the inner surface of the cartridge 110.

In this example, the force application system 118 is an electro-osmotic pump comprising ring electrodes 124, a power source 126 and a control system 128, although other types and numbers of components and other types of force or switch control systems could be used. The ring electrodes 124 are seated adjacent and about each of the openings to the passages 120 in the substrate 112 and are coupled to the power source 126, although other types of conductors in other configurations could be used. The force application system 118 individually and selectively acts on the liquid 114 in the passages 120 in one of the directions of flow, which is to say in the through-flow direction parallel to the passages 120 and thus apply pressure to the drops of liquid 114 on one side of the substrate 112 and control the size and switching position of the drops of liquid 114. One or more of the switch positions of switches 102 move the plunger 108 along the inner surface of the cartridge 110 away from the substrate 112.

The control system 128 is coupled to the power source 126 and each of the ring electrodes 124 and is used to individually and selectively control the application of force by the force application system 118 to move the switch positions of the drops of liquid 114 in each of the switches 102, although other manners for engaging and controlling the switches 102 could be used. In this example, the control system 128 could comprise, by way of example, a computing device with a central processing unit (CPU) or processor, a memory, and an interface or I/O system, which are coupled together by a bus or other link, although other numbers and types of network devices could be used. The computing device, in this example, may run an application to control the application of force by the force application system 118.

An exemplary operation of the dispensing apparatus 100 will now be described with reference to FIG. 9. When engaged by the control system 128, the power source 126 applies a voltage differential across the ring electrodes 124 in one or more of the passages 120 which causes the liquid 114 to exert pressure on the membrane 122, although again the membrane 122 is optional. As each switch 102 is engaged, fluid 116 in reservoir structure 123 offsets any volume removed from the side of the substrate 112 opposing the cartridge 110, although other arrangements could be used. The additional pressure on the membrane 122 applies pressure on the adjacent fluid 116 which pushes on and drives the plunger 108 along the inner surface of the cartridge 110 away from the substrate 112, although the cartridge 110 is optional and plunger 108 could be engaged with an inner surface of the channel 106. Any material in the space of the cartridge on the opposing side of the plunger 108, such as a drug by way of example only, is dispensed out of the cartridge 110 by the plunger 108, although other manners for controlling the dispensing of any material could be used. By way of example only, with the appropriate introduction of passive pressure relief valves, the switches 102 could also be operated in a cyclical manner so that the total volume of fluid dispensed is not limited to the total volume of droplets 102.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Accordingly, the invention is limited only by the following claims and equivalents thereto.

What is claimed is:

1. A dispensing apparatus comprising:
   a housing defining a channel;
   a plunger slidably engaged for movement along the channel;
   a substrate with one or more passages is disposed in the channel on one side of the plunger, each of the passages has two or more openings;
   at least one liquid in each of the one or more passages has a volume which exceeds an internal volume of each the one or more passages and forms a liquid drop around each of the openings, wherein the liquid drops are fluidly connected to one another, each of the liquid drops is individually adjustable between two or more sizes, and each of the sizes and a location of each of the liquid drops defines one of two or more switch positions;
   at least one fluid is located in the channel on the one side of the plunger and substantially surrounding the liquid drops; and
   a force application system that is configured to individually and selectively apply a force on the liquid in each of the one or more passages to control switching between the two or more switch positions of each of the liquid drops, wherein one or more of the switch positions move the plunger along the inner surface of the channel away from the substrate.

2. The apparatus as set forth in claim 1 further comprising a control device coupled to the force application system, the control device controls the individual and selective application of force to the liquid in each of the one or more passages by the force application system.

3. The apparatus as set forth in claim 1 wherein the force application system is at least partially located in the substrate.

4. The apparatus as set forth in claim 1 further comprising a dispensing mechanism coupled to the channel of the housing on the opposing side of the plunger, the channel on the opposing side of the plunger defining a space for a material to be dispensed.

5. The apparatus as set forth in claim 1 wherein the liquid is substantially immiscible with the fluid.

6. The apparatus as set forth in claim 1 further comprising a membrane positioned across each of the openings to the passages on each side of the substrate.

7. The apparatus as set forth in claim 1 wherein the substrate adjacent the openings comprises material surface areas which are poorly wettable by the liquid.

8. The apparatus as set forth in claim 1 wherein the liquid comprises at least one of water, an aqueous suspension, an aqueous solution, an emulsion comprising oil in water, and an emulsion comprising water in oil.

9. A method for making a dispensing apparatus, the method comprising:

providing a housing which defines a channel;

slidably engaging a plunger for movement along the channel;

disposing a substrate with one or more passages in the channel on one side of the plunger, each of the passages has two or more openings;

providing at least one liquid in each of the one or more passages has a volume which exceeds an internal volume of each of the one or more passages and forms a liquid drop around each of the openings, wherein the liquid drops are fluidly connected to one another, each of the liquid drops is individually adjustable between two or more sizes, and each of the sizes and a location of each of the liquid drops defines one of two or more switch positions;

providing at least one fluid in the channel on the one side of the plunger and substantially surrounding the liquid drops, the liquid is substantially immiscible with the fluid; and providing a force application system that is configured to individually and selectively apply a force on the liquid in each of the one or more passages to control switching between the two or more switch positions of each of the liquid drops, wherein one or more of the switch positions move the plunger along the inner surface of the channel away from the substrate.

10. The method as set forth in claim 9 further comprising coupling a control device to the force application system, the control device controls the individual and selective application of force to the liquid in each of the one or more passages by the force application system.

11. The method as set forth in claim 9 wherein the providing a force application system further comprises providing a force application system that is at least partially located in the substrate.

12. The method as set forth in claim 9 further comprising coupling a dispensing mechanism to the channel of the housing on the opposing side of the plunger, the channel on the opposing side of the plunger defining a space for a material to be dispensed.

13. The method as set forth in claim 9 wherein the providing at least one liquid further comprises providing at least one liquid that is substantially immiscible with the fluid.

14. The method as set forth in claim 9 further comprising positioning a membrane across each of the openings to the passages on each side of the substrate.

15. The method as set forth in claim 9 wherein the substrate adjacent the openings comprises material surface areas which are poorly wettable by the liquid.

16. The method as set forth in claim 9 wherein the liquid comprises at least one of water, an aqueous suspension, an aqueous solution, an emulsion comprising oil in water, and an emulsion comprising water in oil.

* * * * *